United States Patent [19]

Kempf et al.

[11] Patent Number: 4,844,223
[45] Date of Patent: Jul. 4, 1989

[54] ARRANGEMENT FOR BRAKING A GEARBOX COMPONENT

[75] Inventors: Bernd Kempf, Althornbach; Heinrich Scheid, Blieskastel, both of Fed. Rep. of Germany

[73] Assignee: Deere & Company, Moline, Ill.

[21] Appl. No.: 146,898

[22] Filed: Jan. 22, 1988

[30] Foreign Application Priority Data

Jan. 22, 1987 [DE] Fed. Rep. of Germany ....... 3701744

[51] Int. Cl.⁴ .................... B60K 41/24; B60K 41/26; F16D 67/02
[52] U.S. Cl. .................... 192/9; 192/12 D; 192/13 R
[58] Field of Search ............ 192/9, 12 D, 18 B, 17 C, 192/13 R; 74/411.5

[56] References Cited

U.S. PATENT DOCUMENTS

| 1,851,571 | 3/1932 | Doman | 192/13 R |
|---|---|---|---|
| 2,550,545 | 4/1951 | Findley | 192/9 X |
| 3,487,438 | 12/1969 | Becker et al. | 192/18 B |
| 3,599,764 | 8/1971 | Daab et al. | 192/12 D |
| 3,978,948 | 9/1976 | Baer | 192/18 B |
| 4,054,181 | 10/1977 | Grosseau | 192/4 A X |
| 4,433,762 | 2/1984 | Prokap et al. | 192/9 X |

FOREIGN PATENT DOCUMENTS

| 8722 | 6/1952 | Fed. Rep. of Germany . | |
| 1136217 | 9/1962 | Fed. Rep. of Germany | 192/13 R |
| 2437865 | 2/1975 | Fed. Rep. of Germany . | |
| 2601418 | 7/1976 | Fed. Rep. of Germany . | |
| 2913859 | 10/1980 | Fed. Rep. of Germany . | |
| 1085453 | 2/1955 | France | 192/18 B |
| 1261402 | 4/1961 | France | 192/18 B |
| 644234 | 9/1962 | Italy | 192/18 B |
| 1380320 | 1/1975 | United Kingdom . | |
| 2003246 | 3/1979 | United Kingdom . | |

*Primary Examiner*—Rodney H. Bonck

[57] ABSTRACT

A change speed gearbox for a combine or the like has a main clutch on its input shaft and a shift collar shiftable into alternate positions from a neutral position to establish different driving ratios in the gearbox. An electromagnetic brake is engageable with the input shaft and is actuated only when the shift collar is in its neutral position and the clutch is disengaged. The brake circuit includes a relay switch that automatically opens a predetermined time after it closes, so that power is supplied to the brake only for a limited period when the clutch is disengaged and the gearbox is in neutral.

3 Claims, 2 Drawing Sheets

ARRANGEMENT FOR BRAKING A GEARBOX COMPONENT

BACKGROUND OF THE INVENTION

This invention relates to a device for braking a component in a change speed gearbox to facilitate shifting of the gearbox and, more particularly, to such a device having particular utility in the gearbox of an agricultural harvesting machine, such as a combine or the like.

The gearbox on an agricultural combine typically is shiftable into different ratios to provide different ground speed ranges for the combine. Such a machine is normally provided with a propulsion drive clutch, and the combine is normally stopped with the clutch disengaged when the gearbox is shifted into its alternate driving conditions. The gearbox shifting is typically accomplished by a simple shiftable collar that engages alternate gears, and when the combine is stopped and the clutch has been disengaged for a significant period, the shifting is accomplished without difficulty. However, the combine during operation in the field, is also normally stopped at relatively frequent intervals, during which the gearbox is placed in a neutral condition and the clutch is re-engaged, so that the transmission input shaft is driven, although the combine is standing still. Instances of this nature occur when the combine is stopped temporarily to allow a slug of crop material to clear the machine or when the grain tank of the combine is being unloaded. Since the input shaft of the gearbox is being driven, the gearbox components up to the shift collar, which is in its neutral position, will be driven, while the gearbox components downstream of the shift collar will be stopped, since they are connected to the stopped drive wheels. When the clutch is disengaged to disconnect the power source from the gearbox input shaft, the momentum of the rotating parts will cause the parts to continue rotating for a period of time, and if the operator tries to shift the collar into an engaged position, the shifting will be difficult since it will involve engagement of a stationary part with a rotating part.

Accordingly, it is known to provide a hydraulic brake that applies a braking force to the rotating gearbox parts simultaneously with the operation of the main clutch, such as shown in West German patent DE 2,913,859, which is also assigned to the assignee herein. However, in the braking arrangement shown in said patent, the hydraulically actuated brake is applied at the same time that the clutch pedal is depressed, so that the brake is applied whenever the clutch pedal is depressed. This means that the brake is applied on many occasions when it is not required.

SUMMARY OF THE INVENTION

According to the present invention, there is provided an improved arrangement for braking a gearbox component to facilitate the shifting of the gearbox into gear.

More specifically, the improved braking arrangement includes an electro-magnetic brake that is actuated for only a short period of time after the gearbox clutch has been disengaged to apply a brief braking force to a rotating gearbox element, temporarily stopping the element to facilitate shifting of the gearbox.

An important feature of the invention is the provision of an electric circuit for actuating the electro-magnetic brake that permits actuation of the brake only when the gearbox is in neutral, so that the brake is supplied only when the gearbox is being shifted form neutral into a higher gear, limiting the number of applications of the brake and reducing the wear thereon.

Still another feature of the invention resides in the provision of an electric relay that closes to supply electric power to the electro-magnetic brake and the provision of a relay that automatically opens after a predetermined time, so that the braking force applied by the electro-magnetic brake is applied for a relatively short period of time, for reducing the wear on the brake. The release of the electro-magic brake after a short period of time also allows for a small amount of rotation of the gearbox input member by means of air friction in the disengaged clutch, so that the input member rotates slowly to move the element in the transmission that is engaged by the shift collar into alignment with the shift collar, thereby facilitating the shifting of the gearbox into gear.

DESCRIPTION OF THE PREFERRED EMBODIMENT

Figure 1:
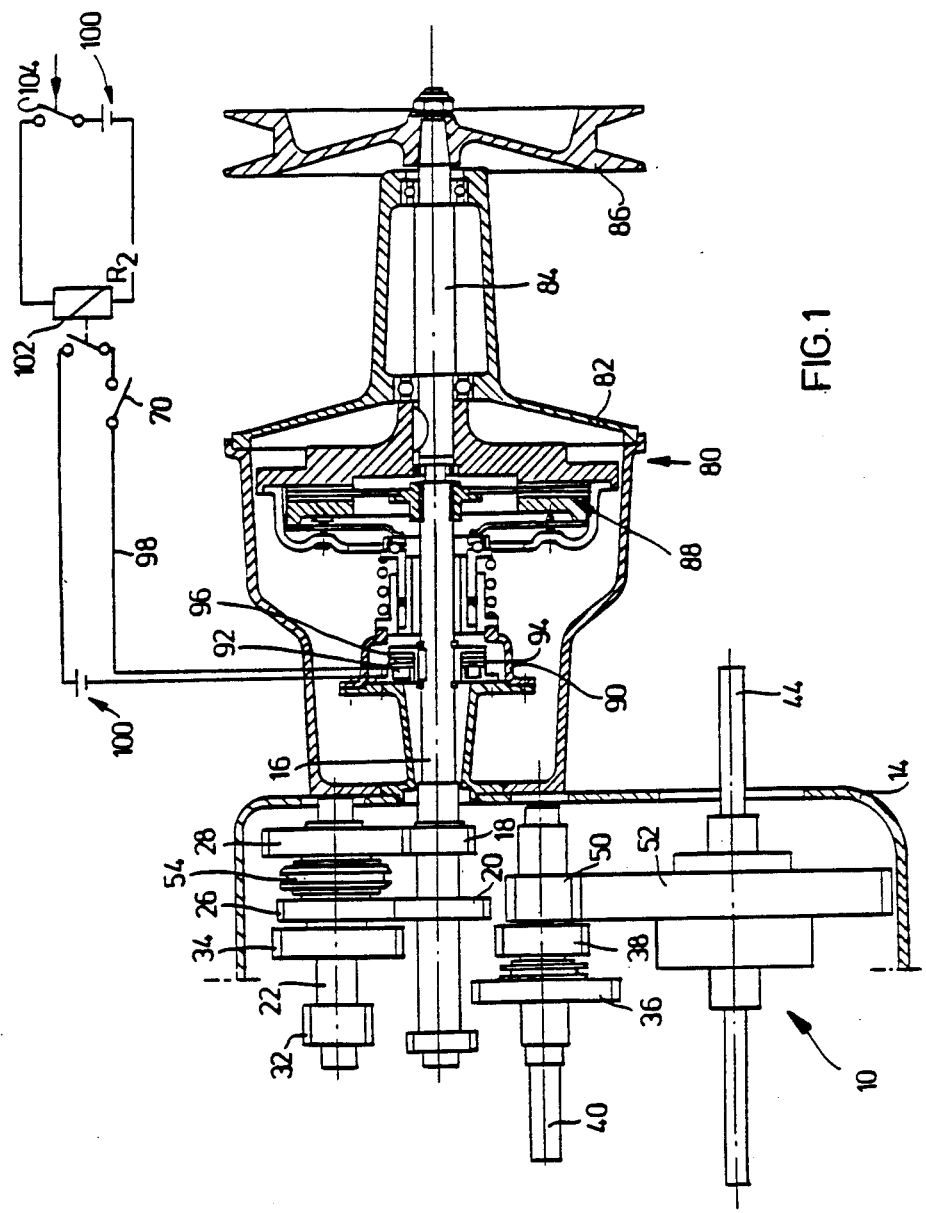
FIG. 1 is a somewhat schematic vertical section through the gearbox embodying the invention, including a schematic of the electrical system for actuating the electro-magnetic brake.

The invention is embodied in a gearbox indicated in its entirety by the numeral 10. The gearbox includes a gearbox housing 14 that journals a gearbox input shaft or member 16. A pair of gears 18 and 20 are respectively mounted on the shaft 16. A second transmission shaft 22 is journaled in the housing parallel to the shaft 16 and carries gears 26 and 28 which are respectively in constant mesh with the gear 20 and 18. The shaft 22 also carries a pair of gears 32 and 34 that are respectively and alternately engageable with a pair of gears 36 and 38 mounted on a third transmission shaft 40. For purpose of clarity, the gears 36 and 38 are illustrated as if they are coplanar with the shafts 16 and 22, while in reality the shaft 40 lies in a different plane, and when the gears 36 and 38 are shifted to the right, as shown in FIG. 1, the gear 38 meshes with the gear 34, while, when the gears 36 and 38 are shifted to the left, the gear 36 meshes with the gear 32, to provide alternate speed ranges in the gearbox. An output shaft 44 is also journaled in the housing 14 and is driven by the shaft 40 by means of a gear 50 that is mounted on the shaft 40 and engages a gear 52 on the shaft 44.

A shift collar 54 is axially slidable on the shaft 22. The shift collar includes internal gearing that is alternately engageable with gear teeth on the inner sides of the gears 26 and 28 to also establish alternate drive gears in the gearbox, the shift collar 54 being shown in its centered or neutral position between the gears 26 and 28 in FIG. 1. All of the above represents more or less conventional gearbox construction.

Figure 2:
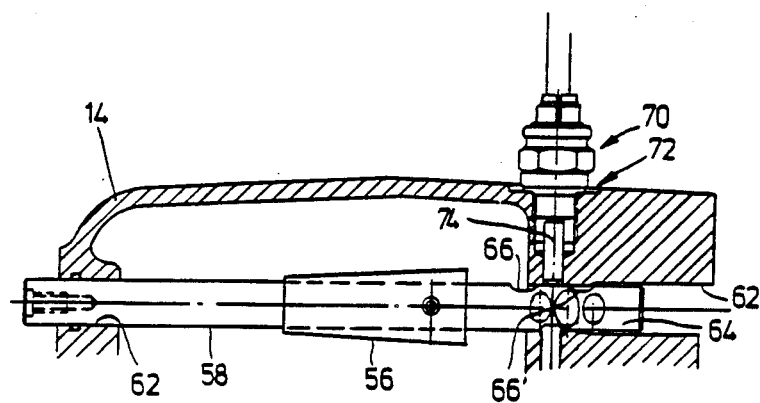
FIG. 2 is a section through a portion of the gearbox showing the electrical switch that is operated by the gearbox shifter shaft.

The shift collar 54 is axially adjusted into its alternate driving positions by means of a shift fork 56, which is partially shown in FIG. 2 and is mounted on an axially shiftable shaft 58, that has its opposite ends slidably mounted in bores 62 in the gearbox housing. One end portion 64 of the shaft 58 is provided with a pair of depressions 66 and 66'. A switch, indicated in its entirety by the numeral 70, is mounted in a threaded bore 72 in the housing 14 and includes an axially shiftable pin or sensor 74 that has its distal end in engagement with the shaft 58. When the shaft 58 is in a position wherein it positions the shift collar 54 in its neutral position, the end of the pin 74 rides on the outer surface of the shaft 58 between the depressions 66 and 66', as shown in FIG. 2. As is apparent, when the shaft 58 is shifted in either direction from its neutral position to shift the shift collar 54 into engagement with one of its mating gears, the pin 74 will fall into either one of the depressions 66 or 66', which permits the switch 70 to close.

Mounted on the input shaft of the gearbox is a clutch, indicated in its entirety by the numeral 80. The clutch includes a clutch housing 82 that journals a clutch input shaft 84 that is co-axial with the gearbox input shaft 16. A sheave 86 is mounted on the end of the shaft 84, the sheave 86 being driven by a conventional belt drive (not shown), such belt drives being well known for providing propulsion drives for combines and the like. The clutch is also of conventional design and includes a clutch actuator 88 that is axially shiftable to move the clutch disks in and out of engagement to selectively connect the shaft 84 to the gearbox input shaft 16. As is well known, the clutch actuator is operated by a clutch pedal (not shown) at the vehicle's operator's station.

Also mounted in the clutch housing 82 is an electro-magnetic brake 90 that includes a brake coil 92 and a friction disk 94 that is shifted into engagement with a clutch pedal 96 when the coil 92 is activated. The above represents more or less well known electro-magnetic brake construction.

The coil 92 is included in an electric circuit that includes wiring 98, a power source 100, conventionally the vehicle's battery, and a relay switch 102, that is also identified by the label R2. The circuit also includes the switch 70, so that power is supplied from the battery 100 to the brake coil 92 only when the switch 70 and the relay switch 102 are closed. The relay switch 102 is a time delay relay that closes when it is supplied with electric power and automatically opens at a predetermined time after it closes. In the preferred embodiment, the time delay is between 0.5 and 1.0 seconds, the nominal or preferable delay being 0.7 seconds. Electric power to close the relay 102 is supplied by the battery or power supply 100 upon the closing of a switch 104, which is closed when the clutch pedal is depressed, so that the relay 102 initially closes as soon as the clutch 80 is disengaged.

In operation, if the combine operator merely wishes to change the gear ratio in the gearbox, the normal procedure would be for the operator to disengage the clutch 80 and bring the combine to a stop. With the combine stopped, the combine wheels, of course, stop the shaft 44 and consequently the other shafts in the gearbox including the shaft 16. With all the elements in the gearbox stopped, shifting the shift collar 54 is normally not a problem, and when the operator shifts the shift collar 54 from one engaged position to another, through neutral, the switch 70 would normally close for only a short period of time while the gearbox is in its neutral condition. A very short period of closing of the switch 70 will normally not cause the electric-magnetic brake 90 to engage, since it takes a fraction of a section for the electro-magnetic brake to actuate after it is connected to the power supply, the time being normally less than 0.5 seconds, which in many cases is long enough for the gear collar to move across the neutral zone. Even if the shifting causes the switch 70 to be closed for 0.5 seconds or more, the short engagement of the brake will have no effect, since the shaft 16 would be stopped anyway.

If the operator disengages the clutch 80 and stops the combine and then shifts the gearbox into neutral, the gearbox shafts will be stopped. However, if the combine is to be stopped for a period of time, such as when the operator is unplugging the machine or unloading the grain tank, the operator will normally re-engage the clutch 80 with the gearbox in neutral, so that the gearbox shaft 16 and the gears 26 and 28 will again be driven, while the gearbox shaft 22 and the shift collar are held stationary. If the operator thereafter wishes to shift the gearbox from neutral into either of the gear ratios wherein the shift collar 54 engages either the gear 26 or gear 28, the operator would then depress the clutch 104, which would immediately close the relay 102. Since the gearbox was in its neutral condition, the switch 70 would be closed, so that electric power is supplied to the electro-magnetic brake, causing the brake to engage after a short interval of time (less than 0.5 seconds). Engagement of the brake will quickly stop the shaft 16 so that the shift collar and the gear which it engages are both stopped. The relay 102 will open shortly thereafter, nominally 0.7 seconds after closing, so that the brake is engaged for only a short period of time, although the period is long enough to stop the shaft 16. After the relay 102 opens and the electro-magnetic brake is disengaged, the shaft 16 is again free to rotate until the shift collar actually engages one of the gears 26 or 28, and the air friction in the clutch 80 is sufficient to provide a small amount of torque to the shaft 16, so that after the brake disengages, the shaft 16 will begin to turn slowly. Thus, if the gear teeth on the gears 26 or 28 are not in exact alignment with the gears on the shift collar, the slow rotation of the shaft 16 will soon bring them into alignment to facilitate shifting of the gearbox into gear.

The actuation of the electro-magnetic brake only when the gearbox is shifted from neutral into one of its drive gears and then only for a brief period of time limits the wear and tear on the brake, so that the brake components should last the life of the gearbox.

We claim:

1. In a gearbox having a gear train and a clutch shiftable between engaged and disengaged conditions to respectively connect and disconnect a drive shaft from an input member of the gear train, said gear train having a shiftable element shiftable from a neutral condition into alternate driving conditions to establish alternate gear ratios in the transmission, an improved device for braking the input member to facilitate shifting of the shiftable member and comprising:

an electro-magnetic brake operatively associated with the input member for applying a braking force to the input member when energized;

a first electric circuit including the electro-magnetic brake, a source of electric power, and a relay switch means that closes in response to an electric current and automatically opens a predetermined interval after it closes and a first switch means operatively connected to the gearbox and closeable in response to shifting of the gearbox into neutral, whereby electric power is supplied to the electromagnetic brake only when the gearbox is in neutral and the relay switch means is closed; and a second electric circuit including the power source, the relay switch means and a clutch switch means operatively connected to and closeable in response to disengagement of the clutch to supply electric current to the relay switch means, whereby the relay switch means closes when the clutch is disengaged and opens said predetermined interval thereafter to supply electric power to the first electric circuit for said interval.

2. The invention described in claim 1 wherein the predetermined interval is between 0.5 and 1.0 seconds.

3. The invention described in claim 1 wherein the driven element of the clutch is coaxially mounted on the gearbox input member.

* * * * *